Jan. 29, 1963  S. P. APPLEBAUM  3,076,193
ELECTRONIC SCANNING OF CIRCULAR ARRAYS
Filed Aug. 19, 1959  2 Sheets-Sheet 1
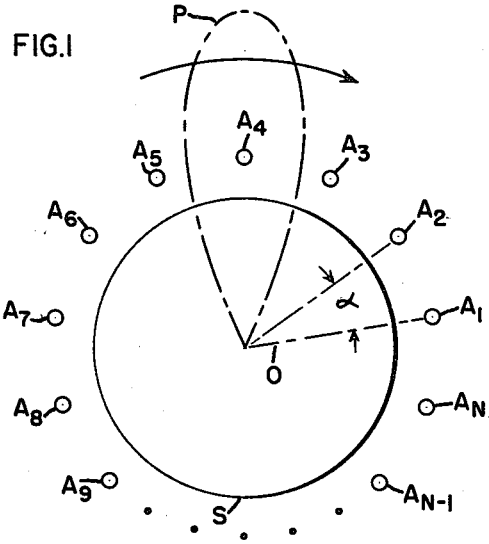
FIG.1
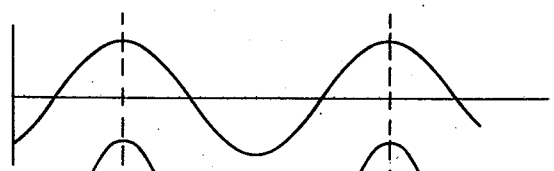
FIG.3a
WAVE OUTPUT FROM 7 IN FIG.2
FIG.3b
WAVE OUTPUT FROM 20 IN FIG.2
TIME ⟶
FIG.3c
AMPLITUDE OF WAVE OUTPUT AT 6 IN FIG.2
POSITION ALONG DELAY LINE ⟶
⟵ TAP NUMBER
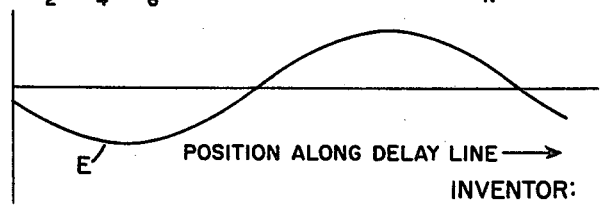
FIG.3d
PHASE MODULATION OF THE OUTPUT OF 6
POSITION ALONG DELAY LINE ⟶
INVENTOR:
SIDNEY P. APPLEBAUM,
BY Michael Masnik
HIS ATTORNEY.

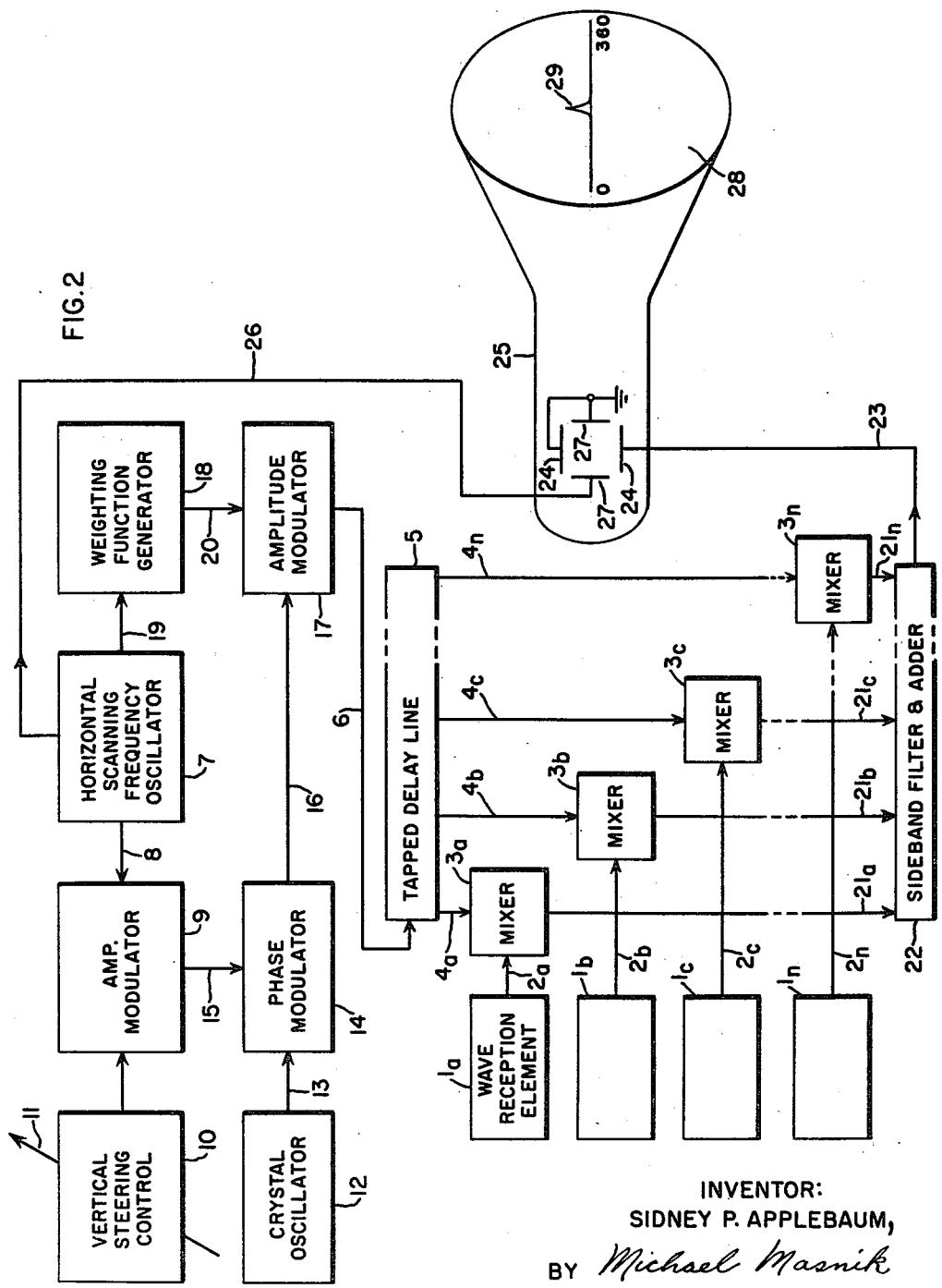

3,076,193
ELECTRONIC SCANNING OF CIRCULAR ARRAYS
Sidney P. Applebaum, Liverpool, N.Y., assignor to General Electric Company, a corporation of New York
Filed Aug. 19, 1959, Ser. No. 835,167
9 Claims. (Cl. 343—118)

This invention relates to arrangements and methods for processing signal waves and particularly to arrangements and methods for modifying a plurality of waves having a first relative phase and amplitude relationship to provide such waves with a different time variable relative phase and amplitude relationship.

Oftentimes signal waves are received which have an undesirable or unacceptable relative phase and amplitude relationship. It is sometimes more practical to alter or modify the existing relative phase and amplitude relationship than to control the manner in which the waves are initially available. For example, it is sometimes desired to smoothly or continuously, effectively vary the direction of directivity of an antena or transducer array comprising a plurality of wave reception elements in order to preferentially receive signals from given directions. This amounts to obtaining the maximum signal energy from a source which has a given directional position with respect to the array. The maximum response axis of such a multi-element array can be changed to a different angle from the natural angle by mechanical movement of the transducer or by electrically changing the phase relationships between the elements of the transducer. Mechanical movement devices suffer from size, weight and complexity limitations. Existing electrical arrangements have proven to be unreliable and to exhibit frequency and other limitations.

It is, therefore, an object of this invention to provide an improved signal processing arrangement.

It is a further object of this invention to provide an arrangement for modifying signal waves having a first relative phase and amplitude relationship to provide such waves with a second different time varying relative phase and amplitude relationship.

It is a further object of this invention to provide an improved, effective rotation of the direction of directivity of a multi-element wave reception array.

Briefly, one embodiment of the invention is directed to an array of wave reception elements positioned around the circumference of a circle. A plurality of separate electrical input waves of common frequency and given relative phase available from these elements are processed to provide such waves with a relative phase relationship which varies with time at a given scanning rate. In this connection means are provided for generating a plurality of scanning signals having time varying phases such that upon mixing with respective ones of said input signals, resultant signals are developed which periodically add in phase. The means for generating the scanning signals comprises a source of phase modulated waves and a tapped delay line wherein the delay time between the plurality of tappings is a function of said scanning rate and the spacing between elements. An arrangement such as described suffers when the individual elements operating in conjunction with supporting structures, etc. exhibit directional properties. Individual elements not receiving desired signal waves because of their directivity can contribute only noise to the resultant output if their outputs are combined with the outputs of the other element upon an equal weighting basis. In accordance with an embodiment of this invention, the phase modulated waves are amplitude modulated according to a desired weighting function before they enter the tapped delay line. The amplitude modulation is synchronized with said scanning rate. The scanning signals available from the delay line are both phase and amplitude modulated. Upon mixing each of said input signals available from said elements with a respective scanning signal available on the respective tapping of said tapped delay line, a plurality of mixed signals are obtained. Mixed signals occurring within a given band of frequencies and added together provide the desired resultant output. The resultant output is equivalent to receiving signal waves in an array exhibiting a directive, scanned wave reception pattern where the amount of signal waves contributed by each element of the array is continuously controlled.

The features of the present invention which are believed to be novel are set forth with particularly in the appended claims. This invention itself, however, both as to its organization and method of operation, together with further objects and advantages thereof, may best be understood by reference to the following description taken in connection with the accompanying drawings in which:

FIG. 1 illustrates schematically an arrangement of wave reception elements mounted around the circumference of a circle;

FIG. 2 illustrates in part schematic and in part block diagram form one arrangement useful in carrying out the invention; and FIG. 3 illustrates graphically certain waveforms useful in explaining the functioning of the arrangement of FIG. 2.

Referring to FIG. 1 there is shown a plurality of sources of wave reception elements $A_1, A_2, A_3 \ldots A_N$. Each of these elements responding to a signal received from a remote object X would provide at its output lead electrical signal waves of a common frequency and a relative phase relationship depending upon the direction of arrival of the signals from said source. If the combination of elements, $A_1, A_2 \ldots A_N$, and their supporting structure shown as S, exhibit a substantially radial directivity in the plane of the array, the wave reception pattern provided by such an arrangement is non-directive if the outputs from each of the elements are simply added together. It is desired to process the outputs available from each of the elements in such a manner as to provide a directive wave reception pattern, as for example that shown as P. It is also desired to process the signals available from each of the elements in such a manner that the directive pattern P is caused to effectively scan (as shown by the arrow) from 0 through 360° at a desired scanning rate about the point 0. Furthermore, it is desired to obtain this scanning action while simultaneously weighting the individual signal wave contributions from each element so as to optimize the signal to noise ratio and/or the resultant resolution pattern of the over-all wave reception system. For example, if the signal wave source appears at X, then element $A_9$, which is masked by structure S, can receive no signal from X. If the output of $A_9$ were added to the useful output available from a signal X contributing element such as $A_4$, the added output could contribute only undesirable noise.

Referring to FIG. 2 there is illustrated an embodiment for carrying out the desired phase and amplitude modulation necessary to achieve the aforementioned results. Mathematically, it can be shown that the desired scanning effect can be accomplished by mixing the waves available at element $A_2$ with the following type of scanning signal:

$$S'\alpha(t) = M(w_s t - \alpha) \cos\left[w_s t - \frac{2\pi R}{\lambda} \sin\theta \cos(w_s t - \alpha)\right]$$

$M=$ the (periodic) amplitude modulation which is synchronized to the scanning frequency and provides the weighting function.

$w_s$=radian scanning frequency of the effective directive wave reception pattern.

$R$=radius of the array circle.

$\lambda$=wavelength of received waves.

$\theta$=elevation angle of the directive reception pattern measured from vertical.

$\alpha$=polar angle location of the element measured with respect to a reference position.

wherein $S'\alpha(t)$=the scanning signal for the element located at angle $\alpha$.

An analysis of this equation indicates that the scanning signal can be modified to accommodate other elevation angles by changing the peak phase deviation of the scanning signal or value of $\theta$. It further follows that one may simultaneously scan in both the horizontal and vertical directions by varying the values $\theta$ continuously with time in accordance with the desired function.

Referring to FIG. 2 there is shown one arrangement for processing the signals available at each of the individual wave reception elements to simulate the reception of such waves in a directive beam P which is rotated for example in azimuth through 360° at a given scanning rate and at a desired elevation angle. The wave reception elements shown in FIG. 1 as $A_1$, $A_2$, $A_3$ . . . $A_n$ are shown as 1a, 1b, 1c . . . 1n in FIG. 2. Each of the outputs of the elements are applied over respective leads 2a, 2b, 2c . . . 2n through mixer circuits 3a, 3b, 3c . . . 3n for mixing with respective scanning signals available on leads 4a, 4b, 4c . . . 4n available from the tappings of a multi-tapped delay line 5. As previously mentioned, the scanning signals are desired to contain both phase and amplitude modulation of a particular type. As previously mentioned also, the input signals available on leads 2a, 2b, 2c . . . 2n have a given phase and amplitude relationship with respect to one another depending upon their positioning on the circumference of the circle shown in FIG. 1, the direction of arrival of said electrical waves and the directivity patterns of the individual elements. The source of scanning signals available on leads 4a, 4b, 4c . . . 4n comprises a tapped delay line having a plurality of tappings associated with each of the leads 4 wherein the time delay between tappings is a function of the positioning of the elements on said circle and the rate of scan of said array. The signals applied to the tapped delay line 5 over lead 6 are derived in the following manner. A source of first signals is provided at 7 having a frequency corresponding to said rate of scan. The signals available from 7 are applied over lead 8 to an amplitude modulator 9 where they are amplitude modulated by signals available from the vertical steering control 10 shown to be adjustable at 11. The amplitude of the signals available from 8 is adjusted by means of 11 in accordance with the desired vertical angle at which the scanning is to be accomplished. A source of second crystal controlled second signals are available from source 12 having a fixed frequency selected such that the product of the time delay between any pair of tapping associated with lines 4 and the said fixed frequency is an integer. The fixed frequency signal from 12 is applied over lead 13 to a phase modulator 14 where it is modulated in phase in accordance with the amplitude of the signals available on lead 15 from the amplitude modulator 9. The resultant phase modulated signals available on lead 16 are applied to an amplitude modulator 17 to be amplitude modulated to provide a desired shaping of the directive wave reception pattern. To accomplish the latter there is provided a weighting function generator 18 which responds to the horizontal frequency scanning oscillations available from 7 on lead 19 for providing an amplitude modulating signal on lead 20. The phase modulated signals available on lead 16 are amplitude modulated by the signal available on lead 20 in modulator 17 to provide a third signal on lead 6 which is then applied to said tapped delay line to provide the desired scanning signals at each of the output leads 4.

Referring to FIG. 3a there is shown the scanning signal available from source 7 in FIG. 2, plotted as ordinate and time as the abscissa. FIG. 3b shows the shape of the amplitude modulating waves available from the weighting function generator 18 of FIG. 2 plotted as ordinate and time as the abscissa. The dotted line indicates that the function generator output is synchronized with the scanning signal. Referring to FIG. 3c the envelope of the phase and amplitude modulated signal available from lead 6 is shown in various stages of propagation down the delay line 5. The wave occurrence is plotted as ordinate and the position along the length of the line $L_1$ $L_2$ is plotted as abscissa. The numbers 1, 2, 3 . . . N indicate, for example, that with respect to the time position shown by envelope $T_1$, elements 2 through 7 are effectively the only ones from which received signal waves will be accepted. The remaining elements are effectively blocked. Envelope time positions $T_2$ and $T_3$ indicate other combinations of array elements providing a useful output. While a given envelope shape has been shown in FIG. 3c, other shapes may be employed depending upon the array element arrangement and directivity and the type of resolution and over-all effective directivity pattern which is desired. FIG. 3d shows the phase modulation of the output on lead 6, FIG. 2, plotted as ordinate and the position along the delay line $L_1$, $L_2$ plotted as the abscissa. The instantaneous amplitude of the envelope E indicates the amount of phase departure associated with the respective elements $A_1$, $A_2$ . . . $A_N$ for the instantaneous condition associated with wave position $T_1$ of FIG. 3c.

Each of the input signals available on leads 2 are mixed in respective mixer circuits 3 with respective scanning signals available on leads 4 to provide a plurality of separate output signals 21a, 21b, 21c . . . 21n occurring within a desired band of frequencies. The signals available on the various leads 21 are applied to circuit 22 where they are vectorially added to provide a resultant signal on lead 23. The resultant signal available on lead 23 is equivalent to having received a signal wave from a directive, optimized reception pattern which is rotated through 360° about a point at a given scanning rate. In order to display the signals available on lead 23, they are applied to the vertical deflection elements 24 of a cathode ray tube 25. A synchronizing signal is applied from the horizontal scanning frequency oscillator 7 over lead 26 to the horizontal deflection elements 27 of the cathode ray tube. The cathode ray tube is of the conventional type such that there appears the display shown on the screen 28 of the cathode ray tube. The display is of such a type that the horizontal angle of arrival of signals appears as the abscissa and the occurrence of the received wave appears as the ordinate. Thus the signals 29 is shown to be arriving from a direction of approximately midway between the zero and 360° azimuth angles of arrival.

In describing the arrangement of FIG. 2, it was mentioned that the mixers 3 perform a selection of desired band of frequencies before the mixed signals are applied to 22. In some applications the vectorial addition can occur prior to frequency bandwidth selection while providing the same desirable results.

While a specific embodiment has been shown and described, it will of course be understood that various modifications may yet be devised by those skilled in the art which will embody the principles of the invention and found in the true spirit and scope thereof.

What I claim and desire to secure by Letters Patent of the United States is:

1. In combination, a source of a plurality of separate electrical input waves of common frequency, said input waves having a given phase relationship with respect to one another, a source of a plurality of control signals containing phase and amplitude modulation, means for mixing each of said input waves with a respective control signal to provide a plurality of separate output waves, means for vectorially adding said separate output waves to provide a resultant wave, and means for utilizing said resultant wave.

2. In combination, a source of a plurality of separate input waves of common frequency, said input waves having a given phase relationship with respect to one another, a source of a corresponding plurality of scanning signals containing phase and amplitude modulation, means for mixing each of said input waves with a respective one of said scanning signals to provide a corresponding plurality of separate output waves occurring within a desired band of frequencies, means for vectorially adding said separate output waves to provide a resultant wave, and means for utilizing said resultant wave.

3. In combination, a source of a plurality of separate input waves of common frequency, said input waves having a given phase relationship with respect to one another, a source of a plurality of separate phase and amplitude modulated scanning signals, one associated with each of said input waves, means for mixing each of said input waves with a respective one of said scanning signals to provide a corresponding plurality of separate output waves occurring within a desired band of frequencies, means for vectorially adding said separate output waves to provide a resultant wave, and means for utilizing said resultant wave.

4. In combination, a source of a plurality of separate first waves of common frequency comprising a corresponding plurality of wave reception elements positioned along the circumference of a circle, said first waves having a given phase relationship with respect to one another depending upon the positioning of said elements along the circumference of said circle and the direction from which waves are received, a source of a corresponding plurality of separate electrical scanning signals, one for each of said first waves, said scanning signals being of the form $$S'\alpha(t) = M(w_s t - \alpha) \cos\left[w_s t - \frac{2\pi R}{\lambda} \sin\theta \cos(w_s t - \alpha)\right]$$

where $M =$ the (periodic) amplitude modulation which is synchronized to the scanning frequency and provides the weighting functions, $w_s =$ radian scanning frequency of the effective directive wave reception pattern, $R =$ radius of the array circle, $\lambda =$ wavelength of received waves, $\theta =$ elevation angle of the directive reception pattern measured from the vertical, $\alpha =$ polar angle location of the element measured with respect to a reference position, wherein $S'\alpha(t) =$ the scanning signal for the element located at angle $\alpha$, means for mixing each of said first waves with a respective scanning signal to provide a plurality of separate output waves occurring within a desired band of frequencies, means for vectorially adding said separate output waves to provide a resultant wave, and means for utilizing said resultant wave.

5. In combination, a source of a plurality of separate input waves of common frequency, said source comprising a corresponding plurality of wave reception elements positioned along the circumferenence of a circle for receiving waves from a remote source, said elements in combination providing a given wave reception directivity pattern, said input waves having a given phase relationship with respect to one another depending upon their positioning on the circumference of said circle and the direction of arrival of waves from said source, means for scanning said pattern at a given rate, comprising a source of a plurality of phase and amplitude modulated scanning signals, one for each of said input waves, said source of scanning signals comprising a tapped delay line having a plurality of tappings wherein the time delay between tappings is a function of the positioning of the elements on said circle and the desired rate of scan, a source of first signals having a frequency corresponding to said rate of scan, means for adjusting the amplitude of said first signals, a source of second signals having a fixed frequency selected such that the product of the time delay between any pair of tappings and the said fixed frequency is an integer, means for phase modulating said second signal with said first signal to provide phase modulated signals wherein the amount of phase modulation is a function of the amount of said amplitude adjustment of said first signal, means responsive to said first signals for providing amplitude modulated signals wherein the amplitude modulation is synchronized with the frequency of said first signals, means for amplitude modulating said phase modulated signals with said last-named amplitude modulated signals to provide a third signal, means for applying said third signal to said tapped delay line and means for withdrawing said third signal as it progresses down said delay line at each of said tappings to provide said plurality of scanning signals, means for mixing each of said input waves with a respective one of said scanning signals to provide a plurality of separate output waves occurring within a desired band of frequencies, means for algebraically adding said separate output waves to provide a resultant wave, and means responsive to said first waves and said resultant wave for displaying received waves as a function of their direction of arrival at said elements.

6. In combination, a source of a plurality of separate first waves of common frequency comprising a corresponding plurality of wave reception elements positioned along the circumference of a circle, said first waves having a given phase relationship with respect to one another depending upon the positioning of said elements along the circumference of said circle and the direction from which waves are received, a source of a plurality of scanning signals, said scanning signals bearing individual phase modulation and amplitude modulation, means for mixing each of said input waves with a respective scanning signal to provide a plurality of separate output waves occurring within a desired band of frequencies, means for vectorially adding said separate output waves to provide a resultant wave, said phase modulation being dimensioned to adjust all said input waves to be in phase upon mixing, said amplitude modulations being dimensioned to maximize the contribution of received waves to said resultant wave upon addition, and means for utilizing said resultant wave.

7. In combination, means for producing a directive wave reception pattern comprising a plurality of wave reception elements positioned along the circumference of a circle, said elements providing respective first waves having a given phase relationship with respect to one another depending upon the positioning of said elements along the circumference of said circle and the direction from which waves are received, means for effectively scanning said pattern at a given rate comprising a source of a plurality of scanning signals, means for mixing the waves received by each element with a respective scanning signal to provide a plurality of separate output waves occurring within a desired band of frequencies, means for vectorially adding said separate output waves to provide a resultant wave, said scanning signals having phase modulation components dimensioned to adjust said waves received by said elements to be in phase upon mixing, said scanning signals having amplitude modulation components dimensioned to effectively shape said wave reception pattern upon addition, and menas for utilizing said resultant wave.

8. An arrangement for effectively varying the direction of directivity of a wave transducing array where the array comprises a plurality of wave reception elements positioned along the circumference of a circle and wherein the waves received by said elements from a remote source of waves have a given phase relationship with respect to one another depending upon their positioning on the circumference of said circle and the direction of arrival of said waves from said source comprising, a source of a plurality of phase and amplitude modulated scanning signals, said source of scanning signals comprising a tapped delay line having a plurality of tappings wherein the time delay between tappings is a function of the positioning of the elements on said circle and said rate of scan, a source of first signals having a frequency corresponding to said rate of scan, means for adjusting the amplitude of said first signals, a source of second signals having a fixed frequency selected such that the product of the time delay between any pair of tappings and the said fixed frequency is an integer, means for phase modulating said second signal with said first signal to provide phase modulated signals wherein the amount of phase modulation is a function of the amount of said amplitude adjustment of said first signal, means responsive to said first signals for providing amplitude modulated signals wherein the amplitude modulation is synchronized with the frequency of said first signals, means for amplitude modulating said phase modulated signals with said last-named amplitude modulated signals to provide a third signal, means for applying said third signal to said tapped delay line and means for withdrawing said third signal as it progresses down said delay line at each of said tappings to provide said plurality of scanning signals, means for mixing each of said element received waves with a respective scanning signal to provide a plurality of separate output waves occurring within a desired band of frequencies, means for vectorially adding said separate output waves to provide a resultant wave, means responsive to said first signals and said resultant wave for displaying received waves as a function of their direction of arrival at said elements.

9. In combination, a plurality of wave reception elements positioned along the perimeter of a curve for receiving waves from a remote source, said elements in combination providing a given wave directivity pattern, said element received waves having a given phase relationship with respect to one another depending upon their positioning on the perimeter of said curve and the direction of arrival of waves from said source, means for scanning said pattern at a given rate comprising, a source of a plurality of phase and amplitude modulated scanning signals, said source of scanning signals comprising a tapped delay line having a plurality of tappings wherein the time delay between tappings is a function of the positioning of the elements on said circle and said rate of scan, a source of first signals having a fixed frequency component and an adjustable phase modulation component, said fixed frequency component being dimensioned such that the product of the time delay between any pair of tappings and the said fixed frequency is an integer, said phase modulation component being synchronized with said rate of scan, a source of second amplitude modulated signals synchronized with said rate of scan, means for amplitude modulating said first signals with said second signals to provide a third signal, means for applying said third signal to said tapped delay line and means for withdrawing said third signal as it progresses down said delay line at each of said tappings to provide said plurality of scanning signals, means for mixing each of said element received waves with a respective scanning signal to provide a plurality of separate output waves occurring within a desired band of frequencies, means for vectorially adding said separate output waves to provide a resultant wave, and means for utilizing said resultant wave.

References Cited in the file of this patent
UNITED STATES PATENTS

| | | |
|---|---|---|
| 2,225,928 | Ring | Dec. 24, 1940 |
| 2,426,460 | Lewis | Oct. 27, 1943 |
| 2,437,281 | Tawney | Mar. 9, 1948 |
| 2,852,772 | Gitzendanner | Sept. 16, 1958 |
| 2,860,336 | Earp et al. | Nov. 11, 1958 |